(12) United States Patent
McWhorter

(10) Patent No.: US 8,378,768 B2
(45) Date of Patent: Feb. 19, 2013

(54) RADIAL AND LINEAR MAGNETIC AXIAL ALIGNMENT CHAMBER

(76) Inventor: Edward Milton McWhorter, Citrus Heights, CA (US)

( * ) Notice: Subject to any disclaimer, the term of this patent is extended or adjusted under 35 U.S.C. 154(b) by 347 days.

(21) Appl. No.: 12/927,828

(22) Filed: Nov. 26, 2010

(65) Prior Publication Data

US 2011/0084788 A1 Apr. 14, 2011

Related U.S. Application Data

(63) Continuation-in-part of application No. 12/286,888, filed on Oct. 3, 2008.

(51) Int. Cl.
*H01F 5/02* (2006.01)

(52) U.S. Cl. .......... 335/299; 335/296; 335/297; 29/605; 336/221; 336/223

(58) Field of Classification Search .................. 335/296, 335/297, 299; 29/602.1, 605, 606; 336/177, 336/221, 222, 223, 225

See application file for complete search history.

(56) References Cited

U.S. PATENT DOCUMENTS

| | | | | |
|---|---|---|---|---|
| 2,982,888 A * | 5/1961 | Whearley | ........................ | 335/299 |
| 2,982,889 A * | 5/1961 | Whearley | ........................ | 335/299 |
| 7,381,378 B2 * | 6/2008 | McWhorter | .................. | 422/168 |
| 7,624,794 B2 * | 12/2009 | Freedman et al. | ........... | 166/66.5 |
| 7,713,400 B2 * | 5/2010 | McWhorter | .................. | 205/354 |
| 7,731,913 B2 * | 6/2010 | McWhorter | .................. | 422/168 |
| 2010/0242264 A1 * | 9/2010 | Mcwhorter | ..................... | 29/605 |
| 2011/0079747 A1 * | 4/2011 | Mcwhorter | .................. | 252/62.2 |

* cited by examiner

*Primary Examiner* — Robert Clemente

(57) ABSTRACT

The invention is a processing component used in electrophoresic conversion of coal fired flue gas carbon dioxide and nitrogen emissions into useful products in lieu of the more costly geosequestration of pollutant by-products produced in the electrical generating and transportation sectors of the economy. Carbon dioxide and facility stack nitrogen imbalance of coal-fired furnace emissions are chemically reacted with electric vehicle fuel cell spent electrolyte in the commercial production of plastic carbon polymers and nitrogen fertilizers.

1 Claim, 3 Drawing Sheets

RADIAL AND LINEAR MAGNETIC AXIAL ALIGNMENT CHAMBER

CROSS REFERENCE

Ref. 1. The present invention is a continuation-in-part of my pending application Ser. No. 12/286,888. Polar Ordinate Chamber. Filed Oct. 3, 2008.

Ref. 2. U.S. Pat. No. 7,381,378. Coal Flue Gas Scrubber. Filed Mar. 9, 2005.

Ref. 3. U.S. Pat. No. 7,731,913. Carbon Dioxide Flue Gas Sequestering Mechanism. Filed Sep. 1, 2005.

Ref. 4. U.S. Pat. No. 7,713,400. Method of Making a Nodular Electrolytic Flocculant. Filed Dec. 13, 2006.

Ref. 5. U.S. patent application Ser. No. 12/587,102. Direct Current Simplex Generator. Filed Oct. 2, 2009.

Ref. 6 U.S. patent application Ser. No. 12/005,093. Potassium Electric Generator and Chemical Synthesizer. Filed Dec. 24, 2007.

BACKGROUND OF THE INVENTION

The byproduct emissions of carbon dioxide ($CO_2$) and nitrogen ($N_2$) from coal-fired steam electrical generating plant furnace scrubbers of Ref 2 and Ref. 3 are reacted with byproducts of electric vehicle spent nodular flocculant electrolytic fuel of Ref. 4. The said byproducts are manmade pollutants produced independently in the electrical generator and transportation sectors of the economy. The said byproducts are presently viewed as contaminating pollutants of air and water and incur a continuing operating overhead material product loss and disposal expense. The burning of one ton of coal produces thirteen (13) tons of emission product loss. Twenty three percent (23%) of these emissions are carbon dioxide ($CO_2$) or about three tons. Carbon dioxide produced in the coal-fired furnace when captured in the scrubbers Ref. 2 and Ref. 3 become value added product used in the commercial manufacturing of organic chemicals in the electrophoresic process of the present invention. Facility stack nitrogen scrubbed free of carbon dioxide and acid gases and mercury become a value-added product used in nitrogen fixation for the commercial production of fertilizers within the same said electrophoresic equipment. The use of facility stack nitrogen shifts the oxygen and nitrogen ratio closer to its original ambient balance. These two sources of value-added byproducts are brought together as feed stocks in a highly activated gaseous field and allowed to cool in deliquescent contraction with reactant moisture to liquid form producing polymeric alkane carbon chains or in combination with nitrogen in forming cyanogenic (CN) compounds as in the polymeric formation of cyanic (CNOH) or cyanuric ($C_2N_3H_3$) acids and most importantly ammonification ($NH_3$) of reactants to form fertilizers and many other nitrated products used in the formulation of commercial chemicals and explosives.

In the beginning process spent electrolytic fuel of Ref. 4 from an electric vehicle fuel cell is reacted with sodium within an injector reaction chamber of Ref. 5. The reaction product produced in the said reaction chamber passes into a mixing chamber where it is mixed with $CO_2$ and/or $N_2$ of Refs. 2 and 3 which are then passed into a capacitor tuyere described in Ref. 6 where electrons ($e^-$) are removed and protons ($H^+$) are formed within a positively charged ionic stream that has many fragmented open bonded substances. Because free electrons have been removed in the said capacitor tuyere the said ionic stream is no longer able to assume its natural equilibrium balance and will form polymeric union as in the case of two molecules of carbon dioxide having similar placed open bonds will form aliphatic or aromatic dicarboxylic acids.

In the capacitor tuyere of Ref. 5 electrons ($e^-$) are removed and protons ($H^+$) are formed within a positively charged ionic stream that contains many fragmented open bonded substances. The said positively charged ionic stream enters the "Radial and Linear Alignment Chamber", hereinafter referred to as the alignment chamber. The positively charged substances within the said stream are oriented in magnetic resonance in two degrees of freedom (radially, axially) within the flowing gaseous stream. The speed of the gaseous flow within the said alignment chamber is subsonic and therefore ultrasonic 20Kc frequency in the receiver barrel outside of the said Alignment Chamber moves upstream kinetically effecting the remaining third dimension and degree of freedom physically bringing affinitive open bonds permanently closer together kinetically to share a singular bonding union.

Chemical reactions between substances within the alignment chamber occur as a result of their attraction for electrons (electrophilic) or for ionic atomic nuclei (nucleophilic). Because the capacitor tuyere removes electrons from an ionized stream the said stream is electro positive$^+$. The electrons removed are used downstream in electrophilic or nucleophilic pairing. (Some first order reactions occur ahead of the capacitor tuyere in the injector reaction chamber). The capacitor tuyere is a force generator (creating charges) and therefore is assumed to operate as the first dynamic function necessary for chemical reaction in the process description which follows in the detailed description.

SUMMARY OF THE INVENTION

The invention is a method for increasing the directive focus of magnetic coils used in electrophoresis of gaseous coal fired furnace emissions.

It is an objective of the invention to produce organic chemicals from carbon dioxide captured and stored at electrical generating plants.

It is yet another objective of the invention to provide a means of fixation of nitrogen from facility smoke stacks to produce nitrogen fertilizers and ammoniated ($NH_3$) organic compounds.

BRIEF DESCRIPTION OF THE DRAWINGS

FIG. 1 is a perspective view of a ceramic alignment chamber.

FIG. 2 is a cross-section view of the said ceramic alignment chamber having magnetic coil wire wrapped and pressed on its exterior surfaces.

FIG. 3 is a side view of the ceramic alignment chamber with the magnetic electrophoresic coil winding forming an assembly.

FIG. 4 is a side view of the containing structure of the assembly of the alignment chamber shown in partial section.

DETAILED DESCRIPTION OF THE INVENTION

Figure 1:
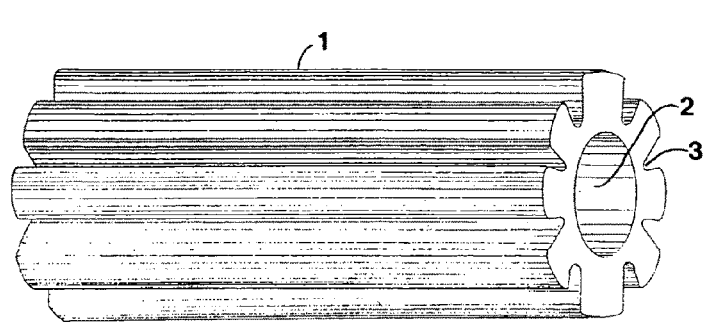
FIG. 1 through 4 describes the claimed elements of the invention while FIG. 5 and FIG. 6 describe how the invention works necessary to show the means of process operation and their workability described in Refs. 5 and 6.

FIG. 1 is a ceramic chamber 1 having a circular bore 2 positioned about its axial center length. Said ceramic chamber 1 having a plurality of grooves 3 evenly radially spaced at even intervals about its exterior surface and running parallel to the axial center length of circular bore 2.

Figure 2:
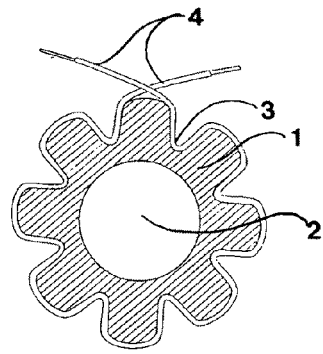

FIG. 2 is a cross-section of ceramic chamber 1. Ceramic chamber 1 which has been centered within a larger circumference diameter spiral coil of magnet wire 4. Said magnet wire 4 pressed into said ceramic chamber 1 grooves 3 such that the said larger diameter spiral coil wire 4 is in contact with the outer surfaces of the ceramic chamber 1. The speed of free electrons within a wire conductor varies inversely with the degree of curvature of the wire conductor.

The speed of free electrons moving through conductor wire 4 of FIG. 2 also varies with the ohmic resistance of wire 4 which in turn varies with conductor wire 4 temperature and as previously stated with the degree of curvature in wire 4. Electron speed in wire 4 is slowest where the curvature is greatest at the bottom of grooves 3. Electron speed slows as they approach the sharp curvature at the bottom of grooves 3 and faster electrons behind them move closer, a phenomenon known as compaction. The electrons moving in wire 4 are negatively charged and have spin and are surrounded by a negative field which being flexibly in communication with said electron spins at the same rate and is also negatively charged. As the population of electrons in wire 4 becomes denser at the bottom of groove 3 their respective fields in contact become entwined and distorted in magnetic compression of repelling nature of like on like charge. As wire 4 curvature increases the said distorted spinning fields cannot follow the parent electron spin and begin to be dislodged as actinic magnetic scatter. As the curvature of wire 4 increases the distorted fields begin to react in a manner somewhat like a compressible fluid kinetically passing through an orifice to achieve some velocity but at faster actinic radiation speeds directed in focus at axial circular bore 2. This occurs at maximum curvature of wire 4 which is the focal point of radiation at the bottom of groove 3 and continues at each loop interval intermittently along the linear distance of the wire 4 coil.

Figure 3:
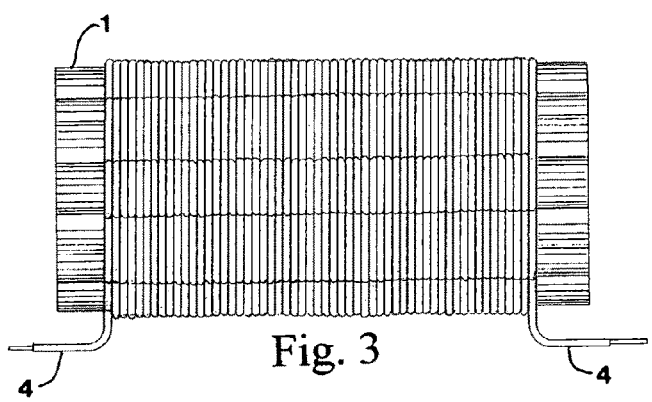

FIG. 3 is a side view of ceramic chamber 1 with magnet wire 4 pressed on its surface forming magnetic coil assembly 5.

Figure 4:
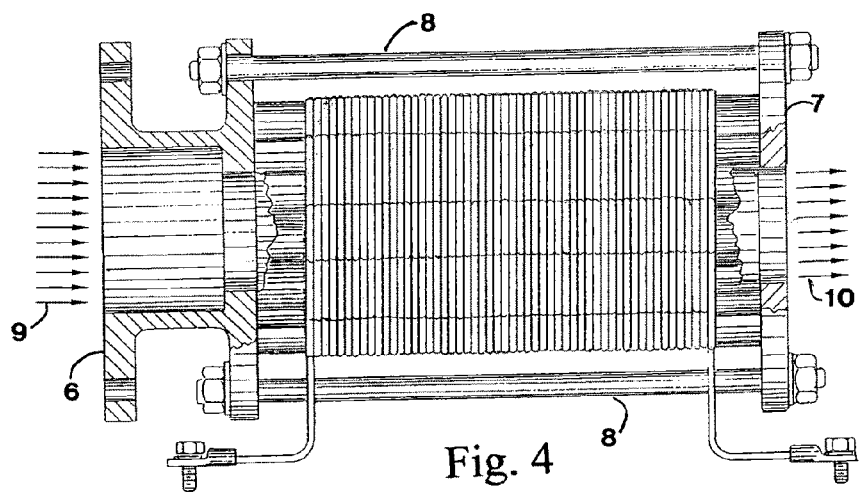

FIG. 4 The said magnetic coil assembly 5 of FIG. 4 is assembled between steel inlet flange 6 and steel outlet flange 7, held in place by lag bolts 8. Said steel flange 6 is the inlet flange for positive charged ions 9 and outlet flow 10 from steel flange 7.

The said positive charged ions of inlet flow 9 entering inlet flange 6 are radially aligned with the circular bore 2 by the said radiation emanating through ceramic chamber 1 wall from magnet wire 4 at the bottom of grooves 3. The said positively charged ions of inlet 9 flowing through center bore 2 are also linearly parallel aligned with the axial center of said bore 2 in passing below each sharp curvature of wire 4. The positive charged gaseous ions flowing through center bore 2 are seen as being both radially and linearly aligned in the said alignment chamber by magnetic resonance induced by said actinic radiation focus into the axial center of bore hole 2 below each groove 3. The magnetic strength (H) of the driving force is not a strong magnetic force as accumulated in multiple layered coils but instead its efficiency depends upon its ability to concentrate flux density (B) at equally spaced intervals both radially and linearly. Chemical bonding at open ends of the charged gaseous flow through bore hole 2 occurs as a physically induced 20Kc sonic pulsed contact and closure (fusion) effected at the remaining third degree of freedom along the common axis passing through the molecular moment of each charged ion bringing them into polymeric neutral alignment.

Figure 5:
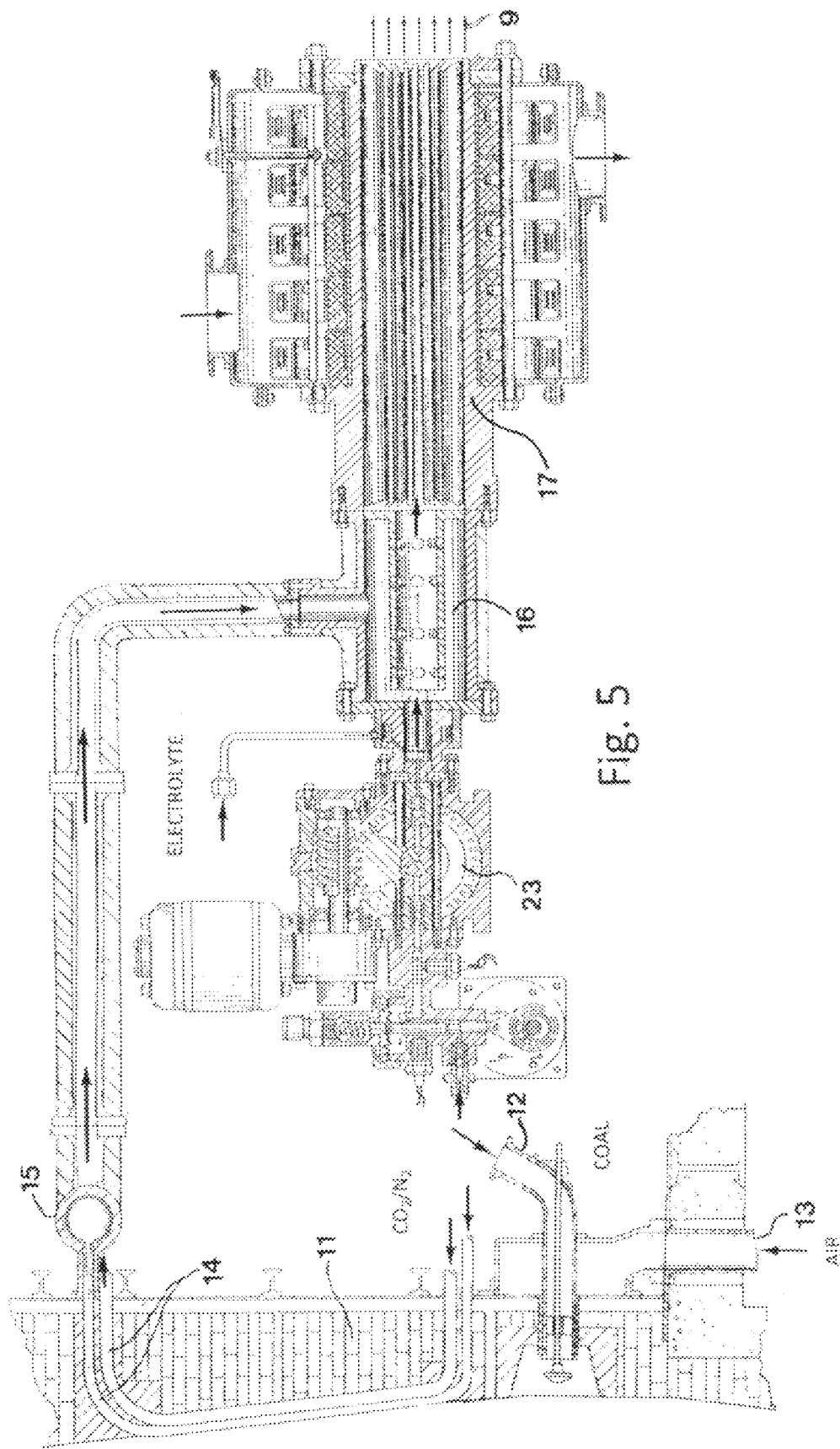
FIG. 5 is an assembly of process equipment producing the gaseous flow into the alignment chamber of FIG. 4.
Figure 6:
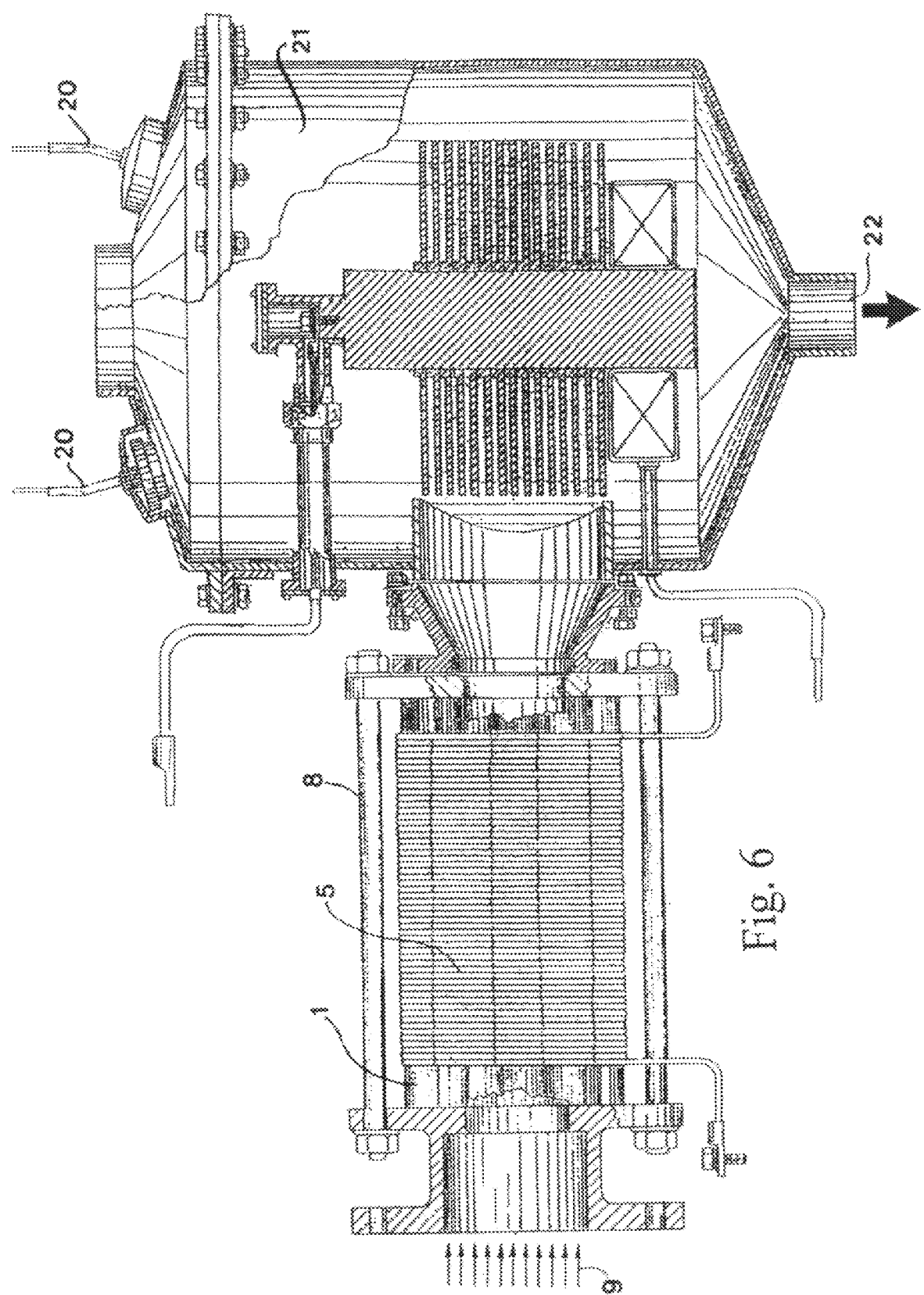
FIG. 6 is an assembly of the alignment chamber in process communication with the product receiver barrel.

Drawing FIGS. 1 to 4 comprising number elements 1 to 10 are the novelty claimed. FIGS. 5 and 6 are process drawings showing how the claimed "Radial and Linear Axial Alignment Chamber" operates within the synthesis process. FIG. 5 and FIG. 6 are component elements of the process previously described in Refs. 5 and 6.

Turning now to FIG. 5 which illustrates the four beginning enabling process steps in the production of the positively charged inlet flow 9 to the alignment chamber. Coal 12 inlet and air 13 inlet are burned in furnace 11 to produce the $CO_2$ and $N_2$ emission products which are regeneratively heated in furnace 11 and passed through lines from insulated manifold 15 into mixing chamber 10 to be mixed with spent electrolyte 19 from simplex generator 20 described in Ref. 5. The reactant mixture stream of mixing chamber 16 passes into capacitor tuyere 17 of Ref. 6 which removes free electrons from the said reaction mixture stream producing the positively charged ionic inlet flow 9 which discharges in the alignment chamber of FIG. 6.

The alignment chamber assembly 5 of FIG. 6 generates magnetic aligning resonance at terahertz frequencies along two axis of the charged molecule moment and physically closes open bonds upon a third axis by sonic resonant response from transducers 23 mounted on anode receiver barrel 21 to produce the intended product 22.

ELEMENTS OF THE INVENTION

FIGS. 1 to 4 Comprising the Claimed Material
 1. Ceramic chamber
 2. Center bore
 3. Grooves (containing wire actinic curature)
 4. Magnet wire
 5. Coil assembly
 6. Steel flange
 7. Steel flange
 8. Lag bolts
 9. Inlet flow
 10. Outlet flow
FIGS. 5 and 6 Explanatory (Means)
 11. Furnace
 12. Coal inlet
 13. Air inlet
 14. Regenerative heating tubes
 15. Insulated manifold
 16. Mixing chamber
 17. Capacitor tuyere
 18. CO2/N2 emission gases
 19. Spent electrolyte
 20. 20Kc ultrasonic
 21. Anode barrel receiver
 22. Product
 23. Simplex generator

What is claimed is:
1. A ceramic cylinder, a bore hole through the axial center length of said ceramic cylinder, a plurality of longitudinal grooves radially spaced at equal intervals around the outer surface perimeter parallel to the axial center length of said ceramic cylinder, magnet wire winding coiled about ceramic cylinder and pressed into said longitudinal grooves forming a sharp turning radius at the bottom of each groove, said magnet wire coil and said ceramic cylinder comprising a magnetic coil assembly said magnetic coil assembly mechanically constrained between two steel flanges held in place by a plurality of lag bolts.

* * * * *